United States Patent
Zhao et al.

(10) Patent No.: US 9,509,160 B2
(45) Date of Patent: Nov. 29, 2016

(54) FAST CHARGING TERMINAL

(71) Applicant: HUIZHOU TCL MOBILE COMMUNICATION CO., LTD., Guangdong (CN)

(72) Inventors: Shiqing Zhao, Guangdong (CN); Dexiang Edward Luo, Guangdong (CN); Xuelong Ronald Hu, Guangdong (CN)

(73) Assignee: HUIZHOU TCL MOBILE COMMUNICATION CO., LTD., HuiZhou, Guangdong (CN)

( * ) Notice: Subject to any disclaimer, the term of this patent is extended or adjusted under 35 U.S.C. 154(b) by 170 days.

(21) Appl. No.: 14/421,682

(22) PCT Filed: Apr. 22, 2014

(86) PCT No.: PCT/CN2014/075949
§ 371 (c)(1),
(2) Date: Feb. 13, 2015

(87) PCT Pub. No.: WO2015/074378
PCT Pub. Date: May 28, 2015

(65) Prior Publication Data
US 2015/0357836 A1 Dec. 10, 2015

(30) Foreign Application Priority Data
Nov. 19, 2013 (CN) .......................... 2013 1 0580544

(51) Int. Cl.
*H01M 10/46* (2006.01)
*H02J 7/00* (2006.01)

(52) U.S. Cl.
CPC .............. *H02J 7/007* (2013.01); *H02J 7/0003* (2013.01); *H02J 7/0052* (2013.01); *H02J 2007/0062* (2013.01)

(58) Field of Classification Search
CPC ............. H02J 2007/0062; H02J 7/007; H02J 7/0052; H02J 7/0003
USPC .................. 320/107, 111, 125, 160
See application file for complete search history.

(56) References Cited

U.S. PATENT DOCUMENTS

| 8,564,249 B2 | 10/2013 | Lundqvist et al. | |
| 2013/0082662 A1* | 4/2013 | Carre | H02J 7/0052 320/134 |
| 2013/0103966 A1* | 4/2013 | Liu | G06F 13/4077 713/340 |
| 2014/0111030 A1* | 4/2014 | Chou | G05F 1/10 307/130 |

FOREIGN PATENT DOCUMENTS

| CN | 201038802 A | 3/2008 |
| CN | 101162848 A | 4/2008 |
| CN | 101997342 A | 3/2011 |
| CN | 103208661 A | 7/2013 |
| CN | 103580255 A | 2/2014 |
| WO | 2008075140 A1 | 6/2008 |

\* cited by examiner

*Primary Examiner* — Edward Tso
(74) *Attorney, Agent, or Firm* — Hauptman Ham, LLP

(57) ABSTRACT

A fast charging terminal is provided, which includes a battery, a USB interface, a switch module, a supply voltage detecting unit, a central processor, and a charging management unit. After the USB interface is connected to an intelligent charger, the switch module is switched on when the supply voltage outputted by the USB interface is within a safe supply voltage range such that the charging management unit converts the supply voltage and the supply current. The charging management unit decreases the supply voltage and increases the supply current to charge the battery.

14 Claims, 1 Drawing Sheet

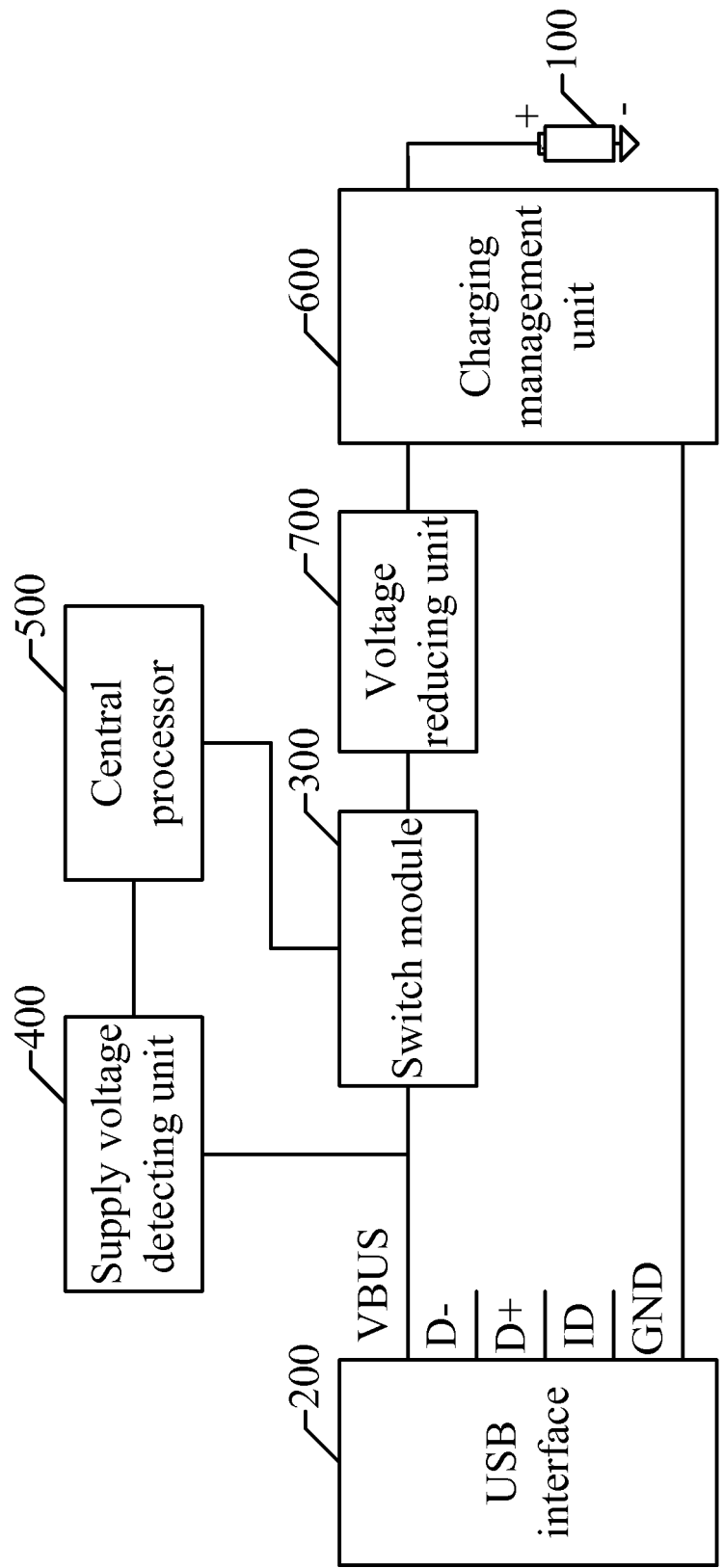

FAST CHARGING TERMINAL

CROSS REFERENCE TO RELATED APPLICATION

This application claims the priority of International Application No. PCT/CN2014/075949, filed on Apr. 22, 2014, which claims priority to Chinese Application No. 201310580544.5, filed on Nov. 19, 2013. The entire disclosures of each of the above applications are incorporated herein by reference.

TECHNICAL FIELD OF THE INVENTION

The present invention relates to an electronic device, and more particularly, to a fast charging terminal.

BACKGROUND OF THE INVENTION

Nowadays, with rapid advancements in technology, fast charging terminals such as intelligent phones and tablet computers are widely used. Recent developments in the fast charging terminals such as intelligent phones and tablet computers have shown that the fast charging terminals get more and more powerful, their display screens are larger and larger, and their central processing units (CPUs) have faster and faster processing speeds. All of these changes make the fast charging terminals increase in power consumption. The battery capacity for these fast charging terminals has to become larger and larger in order to avoid adversely affecting the standby time. However, as the battery capacity is increased, the charging time will be increased, and therefore the user's experience of battery charging gets worse.

Accordingly, shortening the charging time for large-capacity batteries has become one of the main research directions in the electronic terminal industry.

SUMMARY OF THE INVENTION

Considering the above drawbacks existing in the conventional skills, the objective of the present invention is to provide a fast charging terminal for shortening the battery charging time.

To achieve the above objective, the present invention adopts the following technical schemes.

A fast charging terminal, which is charging with an intelligent charger having an output voltage no less than 5V, the fast charging terminal comprising: a battery; a Universal Serial Bus (USB) interface; a switch module; a supply voltage detecting unit for detecting a supply voltage outputted by the USB interface; a central processor for determining whether the supply voltage is within a safe supply voltage range, the central processor controlling the switch module to be switched on when the supply voltage is within the safe supply voltage range; a charging management unit for converting the supply voltage and a supply current outputted by the intelligent charger, the charging management unit decreasing the supply voltage and increasing the supply current so as to fast charge the battery; wherein the USB interface has a VBUS terminal connected to the central processor via the supply voltage detecting unit and connected to the battery sequentially via the switch module and the charging management unit, and the central processor is connected to the switch module; wherein the switch module and the charging management unit have a voltage reducing unit disposed therebetween, and the voltage reducing unit is used to decrease the supply voltage outputted by the USB interface; and wherein the supply current outputted by the charging management unit is no less than 4 A.

In the fast charging terminal, the battery is a battery compatible with a supply current of 2C.

In the fast charging terminal, the battery has cells adopting lithium polymer battery cells that do not explode, burn, and smoke.

In the fast charging terminal, the supply voltage outputted by the intelligent charger is 5V, 9V, 12V, 15V, 20V, or 25V.

In the fast charging terminal, the central processor controls the switch module to be switched off when the supply voltage is too low or too high.

In the fast charging terminal, the VBUS terminal of the USB interface is connected to the supply voltage detecting unit, and the supply voltage detecting unit converts a detected voltage value and then transmits that to the central processor.

In the fast charging terminal, the central processor is used to control the switch module to be switched on such that the charging management unit charges the battery when the supply voltage is within the safe supply voltage range; and the central processor is used to control the switch module to be switched off when an output voltage of the intelligent charger exceeds the safe supply voltage range.

In the fast charging terminal, the width of PCB wiring lines among the voltage reducing unit, the charging management unit, and the battery is above 3 mm In the fast charging terminal, the supply voltage is controlled by the central processor in accordance with a supply voltage curve.

A fast charging terminal, which is charging with an intelligent charger having an output voltage no less than 5V, the fast charging terminal comprising: a battery; a Universal Serial Bus (USB) interface; a switch module; a supply voltage detecting unit for detecting a supply voltage outputted by the USB interface; a central processor for determining whether the supply voltage is within a safe supply voltage range, the central processor controlling the switch module to be switched on when the supply voltage is within the safe supply voltage range; a charging management unit for converting the supply voltage and a supply current outputted by the intelligent charger, the charging management unit decreasing the supply voltage and increasing the supply current so as to fast charge the battery; wherein the USB interface has a VBUS terminal connected to the central processor via the supply voltage detecting unit and connected to the battery sequentially via the switch module and the charging management unit, and the central processor is connected to the switch module.

In the fast charging terminal, the switch module and the charging management unit have a voltage reducing unit disposed therebetween, and the voltage reducing unit is used to decrease the supply voltage outputted by the USB interface.

In the fast charging terminal, the supply current outputted by the charging management unit is no less than 4 A.

In the fast charging terminal, the battery is a battery compatible with a supply current of 2C.

In the fast charging terminal, the battery has cells adopting lithium polymer battery cells that do not explode, burn, and smoke.

In the fast charging terminal, the supply voltage outputted by the intelligent charger is 5V, 9V, 12V, 15V, 20V, or 25V.

In the fast charging terminal, the central processor controls the switch module to be switched off when the supply voltage is too low or too high.

In the fast charging terminal, the VBUS terminal of the USB interface is connected to the supply voltage detecting unit, and the supply voltage detecting unit converts a detected voltage value and then transmits that to the central processor.

In the fast charging terminal, the central processor is used to control the switch module to be switched on such that the charging management unit charges the battery when the supply voltage is within the safe supply voltage range; and the central processor is used to control the switch module to be switched off when an output voltage of the intelligent charger exceeds the safe supply voltage range.

In the fast charging terminal, the width of PCB wiring lines among the voltage reducing unit, the charging management unit, and the battery is above 3 mm.

In the fast charging terminal, the supply voltage is controlled by the central processor in accordance with a supply voltage curve.

Compared to conventional skills, the fast charging terminal provided in the present invention includes a battery, a USB interface, a switch module, a supply voltage detecting unit, a central processor, and a charging management unit. After the USB interface is connected to an intelligent charger, the switch module is switched on when the supply voltage outputted by the USB interface is within a safe supply voltage range such that the charging management unit converts the supply voltage and the supply current outputted by the intelligent charger. The charging management unit decreases the supply voltage and increases the supply current to charge the battery. The present invention adopts an intelligent charger having a supply voltage greater than 5V. The charging management unit decreases the supply voltage and increases the supply current under the principle of unchanged supply power. Charging the battery with a large electronic current can provide charges for the battery in a short time, thereby shortening the charging time.

BRIEF DESCRIPTION OF THE DRAWINGS

FIG. 1 is a structural diagram showing a fast charging terminal provided in accordance with the present invention.

DETAILED DESCRIPTION OF THE INVENTION

To considerably improve battery charging efficiency, the present invention provides a fast charging terminal. To make the objectives, technical solutions, and effects of the present invention more clear and specific, the present invention is described in further detail below with reference to embodiments in accompanying with drawings. It should be understood that the specific embodiments described herein are merely for explaining the present invention and are not intended to limit the present invention.

A USB (Universal Serial Bus) port for electronic terminals is presently a standard USB interface. A supply current provided with the standard USB interface is restricted by a USB connector, a USB data line, and a PCB (Printed Circuit Board) wiring structure, and therefore a maximum of the supply current is limited. The nominal current of the standard USB interface is 500 mA. A risk may occur when a current provided with the standard USB interface exceeds 500 mA. Therefore, increasing input power by increasing the magnitude of an input current is restricted by characteristics of physical devices. Increasing an output current of a battery charger may not obtain the desired output power.

The fast charging terminal provided in the present invention can carry out fast charging by adopting an intelligent charger with an output voltage no less than 5V. As with a charger disclosed in China Patent Application No. 201310126487.3, the charger provided in the present invention can output a supply voltage higher than 5V such as 9V, 12V, and 15V based on the mobile terminal itself. Since the electronic current carried by the USB data line is limited, a current supplied during charging is required to remain at 500 mA. Increasing the output power of the charger by increasing the magnitude of the supply voltage shortens the battery charging time.

The fast charging terminal is a portable mobile terminal such as a cell phone and a tablet computer. To assure that a high voltage is outputted while the current outputted by the charger remains unchanged, a supply voltage outputted by the intelligent charger is 5V, 9V, 12V, 15V, 20V, 25V, or higher. Specifically, on the basis of hardware properties, the fast charging terminal may output a supply voltage which accomplishes the charging for the mobile terminal in the shortest time.

Please refer to FIG. 1, which a structural diagram showing a fast charging terminal provided in accordance with the present invention. As shown in FIG. 1, the fast charging terminal includes a battery 100, an USB interface 200, a switch module 300, a supply voltage detecting unit 400, a central processor 500, and a charging management unit 600. A VBUS terminal of the USB interface 200 is connected to the central processor 500 via the supply voltage detecting unit 400, and is further connected to the battery 100 sequentially via the switch module 300 and the charging management unit 600. The central processor 500 is connected to the switch module 300.

The supply voltage detecting unit 400 is used to detect a supply voltage outputted by the USB interface 200 and feedback a voltage value to the central processor 500. The central processor 500 is utilized to determine whether the supply voltage is within a safe supply voltage range. When the supply voltage is within the safe supply voltage range, the central processor 500 controls the switch module 300 to establish a connection such that the charging management unit 600 starts to work. When the supply voltage is too low or too high, the central processor 500 controls the switch module 300 to cut off the connection so as to protect post-stage circuits. The charging management unit 600 is utilized to convert the supply voltage and the supply current outputted by the intelligent charger. That is, the charging management unit 600 decreases the supply voltage and increases the supply current so as to fast charge the battery 100.

In a specific embodiment, the USB interface 200 is a port connecting to an external charger. The USB interface 200 is commonly a general small-type USB port such as Micro USB. The charging management unit 600 has functions such as voltage detection, voltage adjustment, supply current detection and control, and voltage detection on a rechargeable battery. The switch module 300 may be an analog switch or a switch chip, which is normally in a switch-off state.

During charging, the intelligent charger inputs a high voltage more than 5V to the USB interface 200. The high voltage is inputted to the supply voltage detection unit 400 via the VBUS terminal of the USB interface 200. The supply voltage detecting unit 400 converts a detected voltage value and then transmits that to the central processor 500. The central processor 500 determines whether the supply voltage is within a safe supply voltage range. If yes, the central processor 500 controls the switch module 300 to be switched on such that the charging management unit 600 is actuated to charge the battery 100. If the output voltage of the intelligent charger exceeds the safe supply voltage range (e.g., too high or too low), the central processor 500 controls the switch module 300 to be switched off such that charging is not possible. This avoids damaging the mobile terminal.

When the charging management unit 600 proceeds to charge the battery 100, the supply current outputted by the charger is increased by decreasing the supply voltage outputted by the charger under the principle of unchanged supply power. Charging the battery 100 with a large electronic current shortens the battery charging time, thereby carrying out fast charging.

In a further embodiment, the fast charging terminal provided in the present invention has a voltage reducing unit 700 disposed between the switch module 300 and the charging management unit 600. The voltage reducing unit 700 is used to decrease the supply voltage outputted by the USB interface 200. The present embodiment is primarily employed for a situation in which the charging management unit 600 is incompatible with high voltage input. By way of the voltage reducing unit 700, the voltage outputted by the switch module 300 is decreased and the supply current is correspondingly increased under the aforesaid principle of unchanged power supply. This avoids damaging the charging management unit 600.

In the embodiments of the present invention, the supply current outputted by the charging management unit 600 is no less than 4 A for meeting the requirements of fast charging. In order to make a large electronic current (e.g., a current larger than 4 A) flow among the voltage reducing unit 700, the charging management unit 600, and the battery 100, the present invention also needs to improve wiring lines on the PCB. The PCB wiring lines among the voltage reducing unit 700, the charging management unit 600, and the battery 100 are increased in width such that a large electronic current may flow through them without burning out the PCB. In the present embodiment, the width of the PCB wiring lines among the voltage reducing unit 700, the charging management unit 600, and the battery 100 is above 3 mm.

For meeting the requirements of fast charging, the battery 100 is a battery compatible with a supply current of 2C in the present embodiment. C is rechargeable battery capacity. For example, if the supply current is 2C and the battery capacity is 2.5 AH, the supply current is thus equal to 5 A. The larger the supply current, the shorter the charging time. The 2C supply current adopted in the present invention can shorten the charging time as time length as ½, ⅓, ¼, or ⅕ of the original charging time, or even shorter. To adapt to charging with a large electronic current, the present invention also makes some improvements on the battery 100 for preventing the battery 100 from overcharging. The cells of the battery 100 may adopt lithium polymer battery cells and related cells that are safe and do not explode, burn, and smoke. A specification of the battery 100 is shown in the table below.

| Item | Index |
| --- | --- |
| Cell Type | Li-polymer |
| Fast Charge Current | ≥2 C |
| Nominal Voltage | 3.65 V |
| Charging voltage | 4.2 V ± 0.05 V |
| Cell Internal Resistance | <65 mΩ |
| Maximum Discharge Current | 1.5 C |

During charging, the VBUS terminal of the USB interface 200 is inputted with a high voltage of 5V or above for providing a high-power input. The supply voltage detecting unit 400 transmits the voltage value to the central processor 500, and then the central processor 500 controls the switch module 300 to be switched on. Meanwhile, the charging management unit 600 decreases the inputted high voltage and increases the supply current by way of equal supply power, and then charges the battery 100.

Specifically, the output power of the intelligent charger (i.e., the input power of the fast charging terminal) is $P1=U1 \times I1$, where P1 is the output power of the intelligent charger (equal to the input power of the fast charging terminal), U1 is the output voltage of the intelligent charger (equal to the input voltage of the fast charging terminal), and I1 is the output current of the intelligent charger (equal to the input current of the fast charging terminal). During charging, the output of the intelligent charger is coupled to the charging management unit 600 of the fast charging terminal. The input power of the charging management unit 600 is equal to the output power of the intelligent charger, that is, $P1=U1 \times I1$. After charging management, and DC/DC voltage conversion and current conversion, the output power of the charging management unit 600 is $P2=U2 \times I2$. P2 is the output power of the charging management unit 600. U2 is the output voltage of the charging management unit 600, i.e., the supply voltage for the battery. The supply voltage is controlled by the central processor 500 in accordance with a supply voltage curve and is applied by the charging management unit 600. I2 is the output current of the charging management unit 600, i.e., the supply current for the battery 100. The supply current is controlled by the central processor 500 in accordance with a supply current curve and is applied by the charging management unit 600. U1 is greater than U2 and I1 is smaller than I2.

Ideally, the output power P1 of the intelligent charger is equal to the converted output power P2 of the charging management unit 600, that is, $P1=P2$. In this way, decreasing the supply voltage and meanwhile increasing the supply current under the circumstance of the power remained unchanged is carried out so as to fast charge the battery 100.

In a specific embodiment, assuming that energy conversion efficiency is η for the charging management unit 600 of the fast charging terminal, the result is $P2=P1 \times \eta$ on a basis of conservation of energy. As can be seen from this formula, when the conversion efficiency η is a constant (for high voltage input and low voltage input, the conversion efficiency η of the charging management unit 600 is substantially unchanged or changes little), the output power of the charging management unit 600 increases proportionally (i.e., the charging power increases proportionally) as the input power increases.

As can be known from above analysis, the larger the output voltage U1 and the output current I1 of the intelligent charger, the higher the output power P1 of the intelligent charger. When the output current I1 of the intelligent charger is unchanged and only the output voltage U1 is increased, the output power P1 of the intelligent charger is increased proportionally. The output power of the intelligent charger is equal to the input power of the charging management unit 600 of the fast charging terminal. When the conversion efficiency η of the charging management unit 600 is a constant, the output power of the charging management unit 600 increases proportionally as the input power of the same increases. By way of increasing the input power by increasing the input voltage, the present invention breaks a rule established in a traditional approach increasing the power by increasing the output current with a constant input voltage. Also, the present invention adopts a large electronic current for the charging such that the battery charging time is extremely shortened, thereby sufficiently demonstrating the advantage of fast charging.

It can be understood that a person of ordinary skill in this field can always make equivalent replacements or alterations based on the invention concepts and the technical solutions of the present invention. However, all of these alterations or replacements should be within the scope as defined in the appended claims of the present invention.

What is claimed is:

1. A fast charging terminal, which is being charged with a charger, the fast charging terminal comprising:
   a battery;
   a general connection interface connected to the charger;
   a supply voltage detecting unit connected to the general connection interface, for detecting a supply voltage outputted by the general connection interface;
   a central processor receiving the supply voltage detected by the supply voltage detecting unit, for determining whether the detected supply voltage is within a safe supply voltage range; and
   a charging management unit receiving the supply voltage outputted by the general connection interface when the central processor determines that the detected supply voltage is within the safe supply voltage range, for decreasing the supply voltage and increasing a supply current outputted by the general connection interface so as to fast charge the battery;
   wherein the supply current outputted by the general connection interface is a nominal current of the general connection interface and the supply voltage outputted by the general connection interface is a voltage larger than a nominal voltage of the general connection interface.

2. The fast charging terminal according to claim 1, further comprising a switch module connected between the general connection interface and the charging management unit, the switch module being also connected to the central processor, wherein the central processor controls the switch module to establish a connection between the general connection interface and the charging management unit when the central processor determines that the detected supply voltage is within the safe supply voltage range, and the central processor controls the switch module to cut off the connection between the general connection interface and the charging management unit when the central processor determines that the detected supply voltage exceeds the safe supply voltage range.

3. The fast charging terminal according to claim 1, further comprising a voltage reducing unit disposed between the switch module and the charging management unit for decreasing the supply voltage outputted by the general connection interface.

4. The fast charging terminal according to claim 2, further comprising printed circuit board (PCB) wiring lines disposed among the switch module, the charging management unit, and the battery, wherein the width of the PCB wiring lines is wider than 3 mm.

5. The fast charging terminal according to claim 1, wherein the battery comprises lithium polymer battery cells.

6. The fast charging terminal according to claim 1, wherein the general connection interface comprises a Universal Serial Bus (USB) interface, of which the nominal current is 500 mA and the nominal voltage is 5V.

7. The fast charging terminal according to claim 1, wherein an output voltage of the charging management unit is controlled by the central processor in accordance with a supply voltage curve.

8. The fast charging terminal according to claim 1, wherein an output current of the charging management unit is controlled by the central processor in accordance with a supply current curve.

9. A fast charging terminal, which is being charged with an intelligent charger, the fast charging terminal comprising:
   a battery;
   a Universal Serial Bus (USB) interface;
   a switch module;
   a supply voltage detecting unit for detecting a supply voltage outputted by the USB interface;
   a central processor for determining whether the supply voltage detected by the supply voltage detecting unit is within a safe supply voltage range, the central processor controlling the switch module to be switched on when the supply voltage is within the safe supply voltage range and the central processor controlling the switch module to be switched off when the supply voltage exceeds the safe supply voltage range; and
   a charging management unit for decreasing the supply voltage and increasing a supply current outputted by the USB interface when the switch module is switched on by the central processor, so as to fast charge the battery;
   wherein the supply voltage outputted by the USB interface is a voltage larger than a nominal voltage of the USB interface.

10. The fast charging terminal according to claim 9, wherein the USB interface is connected to the central processor via the supply voltage detecting unit and is connected to the battery sequentially via the switch module and the charging management unit, and the central processor is connected to the switch module.

11. The fast charging terminal according to claim 9, wherein the supply voltage detecting unit converts the supply voltage outputted by the USB interface and then transmits the converted supply voltage to the central processor.

12. The fast charging terminal according to claim 9, further comprising a voltage reducing unit disposed between the switch module and the charging management unit for decreasing the supply voltage outputted by the USB interface.

13. The fast charging terminal according to claim 9, further comprising printed circuit board (PCB) wiring lines disposed among the switch module, the charging management unit, and the battery, wherein the width of the PCB wiring lines is wider than 3 mm.

14. The fast charging terminal according to claim 9, wherein the battery comprises lithium polymer battery cells.

* * * * *